(12) United States Patent
Iyer et al.

(10) Patent No.: US 11,977,563 B2
(45) Date of Patent: May 7, 2024

(54) CROSS-ENTITY CATEGORIZATION OF HETEROGENOUS DATA

(71) Applicant: YAHOO ASSETS LLC, Dulles, VA (US)

(72) Inventors: Chander Iyer, San Jose, CA (US); Xiao Bai, San Jose, CA (US); Ritest Agrawal, Santa Clara, CA (US); Gaurav Batra, Cupertino, CA (US); An Jiang, Sunnyvale, CA (US); Narayan Bhamidipati, Dublin, CA (US)

(73) Assignee: YAHOO ASSETS LLC, New York, NY (US)

( * ) Notice: Subject to any disclaimer, the term of this patent is extended or adjusted under 35 U.S.C. 154(b) by 42 days.

(21) Appl. No.: 17/716,168

(22) Filed: Apr. 8, 2022

(65) Prior Publication Data

US 2023/0325412 A1 Oct. 12, 2023

(51) Int. Cl.
*G06F 16/28* (2019.01)
(52) U.S. Cl.
CPC ................... *G06F 16/285* (2019.01)
(58) Field of Classification Search
CPC .............. G06F 16/285; G06F 16/35
See application file for complete search history.

(56) References Cited

U.S. PATENT DOCUMENTS

| 9,916,611 | B2* | 3/2018 | Hueter | G06Q 30/0255 |
|---|---|---|---|---|
| 2007/0282785 | A1* | 12/2007 | Fayyad | G06Q 30/0244 |
| 2009/0204785 | A1* | 8/2009 | Yates, Jr. | G06F 9/30189 |
| | | | | 712/202 |
| 2012/0054040 | A1* | 3/2012 | Bagherjeiran | G06Q 30/00 |
| | | | | 705/14.66 |
| 2016/0162503 | A1* | 6/2016 | Yao | G06F 16/9535 |
| | | | | 707/723 |
| 2023/0128243 | A1* | 4/2023 | Sundareson | A63F 13/85 |
| | | | | 709/231 |

* cited by examiner

*Primary Examiner* — Merilyn P Nguyen
(74) *Attorney, Agent, or Firm* — James J. DeCarlo; Greenberg Traurig, LLP

(57) ABSTRACT

The techniques described herein relate to constructing and using seed audiences. In an embodiment, a method includes loading, by a processing device, a user event sequence, the user event sequence including a plurality of user events and a plurality of corresponding conversions; generating, by the processing device, a plurality of conversion neighborhoods based on the user event sequence, a given conversion neighborhood in the plurality of conversion neighborhood including at least one conversion rule and a set of user events from the plurality of user events; annotating, by the processing device, each conversion neighborhood in the plurality of conversion neighborhoods with categorical labels; and generating, by the processing device, seed audiences for each conversion neighborhood, a given seed audience including a ranked list of user events for each conversion rule associated with the conversion neighborhood.

20 Claims, 5 Drawing Sheets

CROSS-ENTITY CATEGORIZATION OF HETEROGENOUS DATA

BACKGROUND

Current approaches for categorizing heterogeneous data by building targeted category-specific audiences usually generate results in a single phase and are thus inextensible or are specific to an entity based on correlated data specific to the entity. For example, one entity can create seed definitions from users who navigate to a webpage operated by the entity or from aggregated user demographic profiles. However, such definitions fail to capture global user interest indicating travel (e.g., search queries for a user who navigates to a competitor entity) which are useful for inclusion in seed audiences. Also, current approaches are expensive to scale for heterogeneous events.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
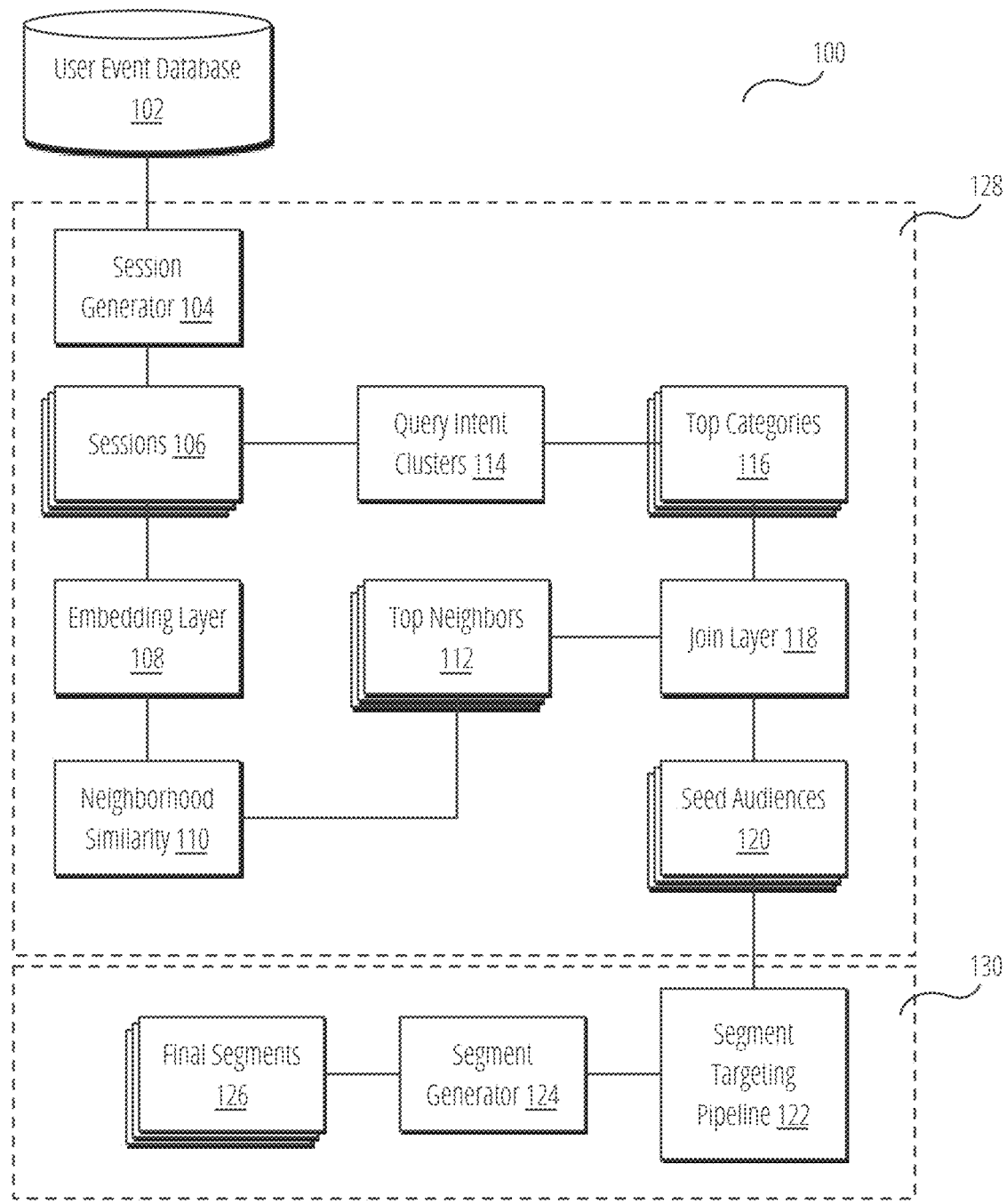
FIG. 1 is a block diagram of a system for building seed audiences and segments according to some of the example embodiments.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

The example embodiments describe techniques for generating category-specific audiences from heterogeneous user event sequences. The example embodiments leverage latent user interests for specific actions from these event sequences that co-occur with conversion events across multiple clients.

The example embodiments generate category-specific seed audiences that have the following characteristics. First, the seed audiences are created using embedding representations of heterogeneous user events such as search queries, mail order purchases, page visits, etc., indicative of user intent in a completely unsupervised manner. Second, user events can co-occur with several conversion rules and hence can build cross-entity targeted audiences. This helps entities to expand their audiences beyond their current audience that are targeted towards specific interactions. Third, latent user interests present in these events are captured by categories belonging to a taxonomy hierarchy. The example embodiments are taxonomy-agnostic and can be easily customized for any particular category taxonomy. Fourth, the category-specific seed audiences are generated in an automated manner as a ranked list of the most relevant conversion rules in the neighborhoods of these events. The example embodiments can leverage existing audience expansion approaches like Predictive Audiences/Predictive Segments (PA/PS) to build targeted segments as a flexible, modular framework.

The example embodiments can generate category-specific audiences by re-utilizing audience expansion approaches. As will be discussed, various audience expansion approaches can be used, which allows the example embodiments to be modular enough to customize for any future audience expansion approaches that build on seed audiences. In an embodiment, a segment targeting pipeline is described that generates targeted segments using events annotated with categories from a category taxonomy. A two-stage approach to generating such audiences is described more fully in the following embodiments.

In some aspects, the techniques described herein relate to a method including loading, by a processing device, a user event sequence, the user event sequence including a plurality of user events and a plurality of corresponding conversions; generating, by the processing device, a plurality of conversion neighborhoods based on the user event sequence, a given conversion neighborhood in the plurality of conversion neighborhood including at least one conversion rule and a set of user events from the plurality of user events; annotating, by the processing device, each conversion neighborhood in the plurality of conversion neighborhoods with categorical labels; and generating, by the processing device, seed audiences for each conversion neighborhood, a given seed audience including a ranked list of user events for each conversion rule associated with the conversion neighborhood.

In some aspects, the techniques described herein relate to a method, wherein generating a plurality of conversion neighborhoods includes computing embeddings for the plurality of user events and the plurality of corresponding conversions and computing similarities among the plurality of user events and the plurality of corresponding conversions.

In some aspects, the techniques described herein relate to a method, wherein computing similarities includes using a an approximate neighbor search algorithm to compute the similarities.

In some aspects, the techniques described herein relate to a method, wherein annotating a respective conversion neighborhood in the plurality of conversion neighborhoods with categorical labels includes classifying each user event in the respective conversion neighborhood based on a pre-built taxonomy of category labels.

In some aspects, the techniques described herein relate to a method, wherein classifying each user event in the respective conversion neighborhood includes inputting each user event into a random forest model.

In some aspects, the techniques described herein relate to a method, further including generating the ranked list of user events for each conversion rule by computing similarities between embeddings representing the user events and embeddings representing the conversion rules.

In some aspects, the techniques described herein relate to a method, further including: expanding, by the processing device, a seed audience in the seed audiences into a set of users; computing, by the processing device, conversion probabilities for the set of users; segmenting, by the processing device, the set of users into segments based on the conversion probabilities; and returning, by the processing device, a subset of the segments to a user.

In some aspects, the techniques described herein relate to a device including: a processor; and a storage medium for tangibly storing thereon program logic for execution by the processor, the program logic including: logic, executed by the processor, for loading a user event sequence, the user event sequence including a plurality of user events and a plurality of corresponding conversions; logic, executed by the processor, for generating a plurality of conversion neighborhoods based on the user event sequence, a given conversion neighborhood in the plurality of conversion neighborhood including at least one conversion rule and a set of user events from the plurality of user events; logic, executed by the processor, for annotating each conversion neighborhood in the plurality of conversion neighborhoods with categorical labels; and logic, executed by the processor, for generating seed audiences for each conversion neighborhood, a given seed audience including a ranked list of user events for each conversion rule associated with the conversion neighborhood.

In some aspects, the techniques described herein relate to a device, wherein generating a plurality of conversion neighborhoods includes computing embeddings for the plurality of user events and the plurality of corresponding conversions and computing similarities among the plurality of user events and the plurality of corresponding conversions.

In some aspects, the techniques described herein relate to a device, wherein computing similarities includes using an approximate neighbor search algorithm to compute the similarities.

In some aspects, the techniques described herein relate to a device, wherein annotating a respective conversion neighborhood in the plurality of conversion neighborhoods with categorical labels includes classifying each user event in the respective conversion neighborhood based on a pre-built taxonomy of category labels.

In some aspects, the techniques described herein relate to a device, wherein classifying each user event in the respective conversion neighborhood includes inputting each user event into a random forest model.

In some aspects, the techniques described herein relate to a device, the program logic further including logic, executed by the processor, for generating the ranked list of user events for each conversion rule by computing similarities between embeddings representing the user events and embeddings representing the conversion rules.

In some aspects, the techniques described herein relate to a device, the program logic further including: logic, executed by the processor, for expanding a seed audience in the seed audiences into a set of users; logic, executed by the processor, for computing conversion probabilities for the set of users; logic, executed by the processor, for segmenting the set of users into segments based on the conversion probabilities; and logic, executed by the processor, for returning a subset of the segments to a user.

In some aspects, the techniques described herein relate to a non-transitory computer-readable storage medium for tangibly storing computer program instructions capable of being executed by a computer processor, the computer program instructions defining steps of: loading a user event sequence, the user event sequence including a plurality of user events and a plurality of corresponding conversions; generating a plurality of conversion neighborhoods based on the user event sequence, a given conversion neighborhood in the plurality of conversion neighborhood including at least one conversion rule and a set of user events from the plurality of user events; annotating each conversion neighborhood in the plurality of conversion neighborhoods with categorical labels; and generating seed audiences for each conversion neighborhood, a given seed audience including a ranked list of user events for each conversion rule associated with the conversion neighborhood.

In some aspects, the techniques described herein relate to a non-transitory computer-readable storage medium, wherein generating a plurality of conversion neighborhoods includes computing embeddings for the plurality of user events and the plurality of corresponding conversions and computing similarities among the plurality of user events and the plurality of corresponding conversions.

In some aspects, the techniques described herein relate to a non-transitory computer-readable storage medium, wherein computing similarities includes using an approximate neighbor search algorithm to compute the similarities.

In some aspects, the techniques described herein relate to a non-transitory computer-readable storage medium, wherein annotating a respective conversion neighborhood in the plurality of conversion neighborhoods with categorical labels includes classifying each user event in the respective conversion neighborhood based on a pre-built taxonomy of category labels.

In some aspects, the techniques described herein relate to a non-transitory computer-readable storage medium, wherein classifying each user event in the respective conversion neighborhood includes inputting each user event into a random forest model.

In some aspects, the techniques described herein relate to a non-transitory computer-readable storage medium, further including generating the ranked list of user events for each conversion rule by computing similarities between embeddings representing the user events and embeddings representing the conversion rules.

FIG. 1 is a block diagram of a system for building seed audiences and segments according to some of the example embodiments.

In an embodiment, system 100 includes a seed audience generator 128 and a segment generator 130. In an embodiment, the seed audience generator 128 accesses user activity from user event database 102 and generates a set of seed audiences 120. The segment generator 130 receives these seed audiences, expands the audiences, and generates a set of final segments 126 that can be used for downstream applications (e.g., targeted advertising). In some embodiments, seed audience generator 128 and segment generator 130 can be implemented on separate computing devices, while in other embodiments, the seed audience generator 128 and segment generator 130 can be implemented on the same computing device.

In an embodiment, the user event database 102 can comprise a database, data lake, big data storage system, or other repository of data. In an embodiment, the user event database 102 stores user event sequence data. In an embodiment, user event sequence data refers to data recorded about a user's interactions with network content. The user event sequence data can be collected by monitoring user interactions with webpage, mobile applications, or other computer-implemented interfaces. A user event sequence data comprises a set of events associated with one or more users. A given event in the user event sequence data describes an action undertaken by a user with respect to a network application. Examples of events include, but are not limited to, selection of hyperlinks, purchases arising from email promotions, search queries entered in a search engine interface, impressions of content (via mobile applications, webpages, etc.), advertisement impressions, clickstream data, advertisement pixel impressions, advertisement clicks or conversions, etc. In some embodiments, the user event sequence data can comprise all recorded events. In other embodiments, the user event sequence data can comprise a fixed time period of events (e.g., the last thirteen months). The following description uses search queries and conversion rules as examples of events in a user event sequence data, however the disclosure is not limited as such.

In an embodiment, the seed audience generator 128 includes a session generator 104. In an embodiment, the session generator 104 generates a plurality of sessions based on the user trail data in the user event database 102. In brief, session generator 104 can perform a temporal analysis to identify all search queries occurring within thirty minutes of a given conversion associated with a conversion rule. Sessions are provided to an embedding layer 108 and query intent clusters 114.

In an embodiment, the embedding layer 108 constructs embedding representations of search queries and conversion pixels in sessions 106 using a distributed event representations approach similar to word2vec. The embedding representations are then fed to a neighborhood similarity algorithm 110 which generates the top neighbors 112 for each conversion rule. In some embodiments, top neighbors 112 can comprise the top N neighbors, where N is a configurable threshold. As illustrated, the query intent clusters 114 receive sessions 106 and obtain category labels for each of the sessions 106. The query intent clusters 114 can aggregate the sessions to obtain the top categories 116 for each search query in the sessions 106 that occurs above a minimum frequency threshold. In some embodiments, top categories 116 can comprise the top M categories, where M is configurable threshold.

In an embodiment, the top categories 116 and top neighbors 112 are provided to a join layer 118. In an embodiment, the join layer 118 can select the top X search queries for each conversion rule. In some embodiments, the top X search queries can be identified based on the affinity to a given conversion rule. Since each search query and each conversion rule is converted to a vector, the affinity between given search query (or other events) and a conversion rule can be computed mathematically. For example, cosine similarity between a search query vector and a conversion rule vector can be computed and these similarities can be ranked to obtain the top X search queries. From these top X search queries, the corresponding category labels can then be inspected and filtered. Specifically, a list of unique category labels for the top X search queries can be generated. In some scenarios, multiple search queries can be associated with the same label, thus, in some embodiments, join layer 118 can average the ranking (e.g., relevancy score) of all occurrences of a category label when combining the list of category labels. In some embodiments, join layer 118 can then select the top Y category labels based on the combined list. The selection of the top Y category labels can be performed for each neighborhood associated with a given conversion rule. In some embodiments, join layer 118 invert the mapping to obtain a mapping of categories to conversion rules. Specifically, a list of unique categories can be obtained across all neighborhoods, then for each category, a list of neighborhoods being associated with a given category can be constructed. Finally, the list of neighborhoods for each category can be ranked based on their relevancy. Thus, a list of categories with top K conversion rules (i.e., neighborhoods) can be obtained. Categories and their top K conversion rules are referred to as seed audiences 120. Further detail on seed audience generator 128 is provided in the description of FIG. 2, which is not repeated herein.

In an embodiment, the segment generator 130 receives the seed audiences 120 and generates final segments 126 therefrom. In an embodiment, a segment targeting pipeline 122 processes the seed audiences 120 to expand the seed audience and calculate conversion probabilities. The segment targeting pipeline 122 transmits the expanded audience and probabilities to a segment generator 124 which computes the final segments 126. In an embodiment the segment targeting pipeline 122 can expand, a seed audience in the seed audiences into a set of users by applying one or more conversion rules to a corpus of users over a time period. Next, the segment targeting pipeline 122 can compute conversion probabilities for the set of users. In some embodiments, the segment targeting pipeline 122 inputs the expanded users into a predictive model which computes their expected conversion probability. Next, the segment generator 124 can segment the set of users into segments based on the conversion probabilities and return the final segments 126 to a user. Further detail on segment generator 130 is provided in the description of FIG. 3, which is not repeated herein.

Figure 2:
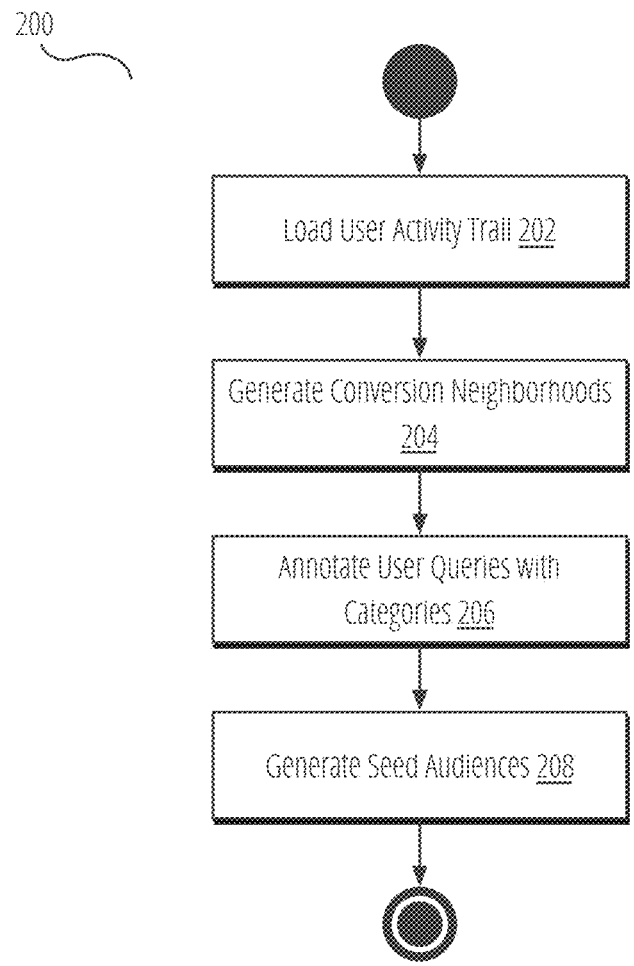
FIG. 2 is a flow diagram illustrating a method for building a seed audience according to some of the example embodiments.

FIG. 2 is a flow diagram illustrating a method for building a seed audience according to some of the example embodiments.

In step 202, method 200 can include loading user event sequence data.

In an embodiment, user event sequence data refers to data recorded about a user's interactions with network content. The user event sequence data can be collected by monitoring user interactions with webpage, mobile applications, or other computer-implemented interfaces. A user event sequence data comprises a set of events associated with one or more users. A given event in the user event sequence data describes an action undertaken by a user with respect to a network application. Examples of events include, but are not limited to, selection of hyperlinks, purchases arising from email promotions, search queries entered in a search engine interface, impressions of content (via mobile applications, webpages, etc.), advertisement impressions, clickstream data, advertisement pixel impressions, advertisement clicks or conversions, etc. In some embodiments, the user event sequence data can comprise all recorded events. In other embodiments, the user event sequence data can comprise a fixed time period of events (e.g., the last thirteen months). The following description uses search queries and conversion rules as examples of events in a user event sequence data, however the disclosure is not limited as such.

In some embodiments, step 202 can comprise processing a global corpus of user event sequence data based on conversion rules. A conversion rule can specify that user perform a specific action with a webpage, mobile application, etc. For example, a conversion rule can state that a user must add a content item to a shopping cart. As another example, a conversion rule can state that a user must access a Uniform Resource Locator (URL) having a certain term.

In some embodiments, the user event sequence data can be pre-processed to associate search queries (or similar events) with conversion rules. In an embodiment, a temporal analysis is performed to identify all search queries occurring within thirty minutes of a given conversion associated with a conversion rule. A grouping of user activities and a conversion rule is referred to as a session. Thus, in an embodiment, step 202 can comprise generating a set of sessions, each session including one or more events and a corresponding conversion rule.

In step 204, method 200 can include generating conversion neighborhoods.

In an embodiment, step 204 can include generating machine learning (ML) embeddings for search session. In some embodiments, a distributed event representations approach similar to word2vec can be used to convert each mapping of sessions to conversion rules as a vector. In some embodiments, the use of a distributed event representations approach, as applied to a session represents the likelihood of a given session of events resulting in a conversion rule being triggered, represented as a vector. In some embodiments, step 204 generates a vector for a set of search queries and a separate vector for a correspond conversion rule.

In some embodiments, step 204 can include applying an approximate neighbor search (e.g., locality-sensitive hashing (LSH)) algorithm to the vectors representing the sessions to hash similar vectors into the buckets with high probability. In some embodiments, the approximate neighbor search algorithm can use a MinHash algorithm to compute the buckets. In some embodiments, step 204 can comprise selecting the top N buckets from the identified buckets. In some embodiments, the top buckets comprise buckets having the largest number of vectors in them.

In step 206, method 200 can include annotating user queries with categories. In an embodiment, method 200 can select each neighborhood generated in step 204 and extract each of the queries associated with the neighborhood. In some embodiments, step 206 can include using a classifier to assign a list of potential categories to each search query in a given neighborhood. Thus, after step 204, method 200 can generate a bucket of n search queries for a given conversion rule. Then, in step 206, method 200 can annotate each of these search queries with m categorical labels. Thus, after step 206, method 200 generates an n-by-m matrix of category labels. In some embodiments, the value of m can be fixed (e.g., ten), although a specific number of categories is not intended to be limiting.

In some embodiments, step 206 can comprise using pre-built taxonomy of category labels to assign categories to a given query. In some embodiments, step 206 can comprise assigning multiple categories to a query. In some embodiments, these multiple categories can be ranked by their relevance (e.g., a ranking score) to a query. In some embodiments, an ML approach can be used to assign categorical labels to a query. For example, a random forest or similar approach can be used to assign category labels to a given query. In some embodiments, the taxonomy of categories is independent of the events (e.g., search queries) and thus is agnostic to the underlying event type. In this manner, the ML model used can be trained and re-trained independent of seed audience construction performed using method 200.

In step 208, method 200 can include generating a seed audience for each neighborhood.

In an embodiment, step 208 can include selecting the top X search queries for each conversion rule. In some embodiments, the top X search queries can be identified based on the affinity to a given conversion rule. Since each search query and each conversion rule is converted to a vector, the affinity between given search query (or other event) and a conversion rule can be computed mathematically. For example, cosine similarity between a search query vector and a conversion rule vector can be computed and these similarities can be ranked to obtain the top X search queries. From these top X search queries, the corresponding category labels can then be inspected and filtered. Specifically, a list of unique category labels for the top X search queries can be generated. In some scenarios, multiple search queries can be associated with the same label, thus, in some embodiments, method 200 can average the ranking (e.g., relevancy score) of all occurrences of a category label when combining the list of category labels. In some embodiments, method 200 can then include selecting the top Y category labels based on the combined list. As discussed, the selection of the top Y category labels can be performed for each neighborhood associated with a given conversion rule. In some embodiments, step 208 can further comprise inverting the mapping to obtain a mapping of categories to conversion rules. Specifically, a list of unique categories can be obtained across all neighborhoods, then for each category, a list of neighborhoods being associated with a given category can be constructed. Finally, the list of neighborhoods for each category can be ranked based on its relevancy. Thus, at the completion of method 200, a list of categories with top K conversion rules (i.e., neighborhoods) can be obtained. A given category with top K conversion rules is referred to as a seed audience for the given category.

Figure 3:
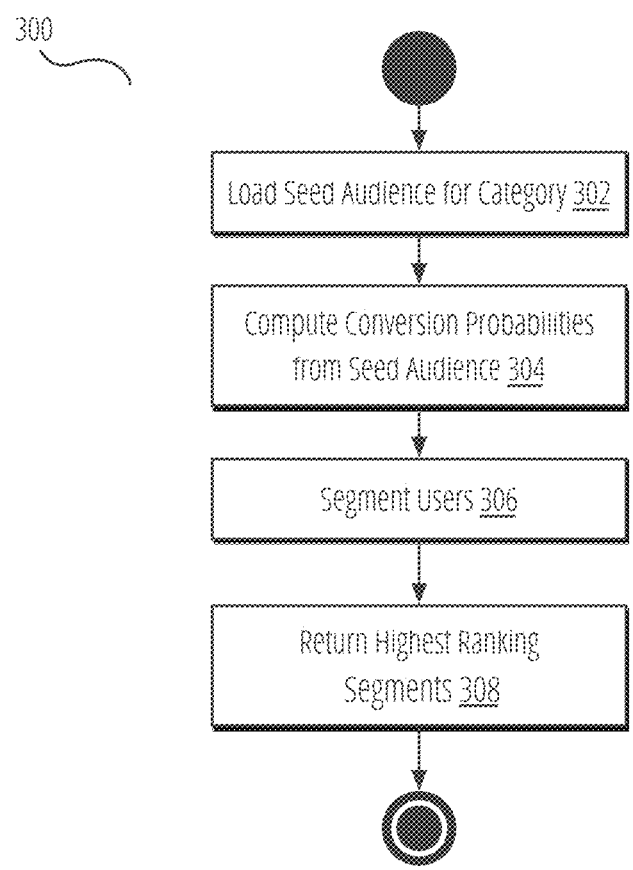
FIG. 3 is a flow diagram illustrating a method for building a predicted audience using a seed audience according to some of the example embodiments.

FIG. 3 is a flow diagram illustrating a method for building a predicted audience using a seed audience according to some of the example embodiments.

In step 302, method 300 can include loading a seed audience for a category. In an embodiment, the seed audience comprises a category and a set of top K conversion rules identified using method 200, described above. Details of generating seed audiences are not repeated herein. Additionally, while method 300 is depicted for a single seed audience, method 300 can be repeated as necessary for multiple categories.

In step 304, method 300 can include calculating conversion probabilities based on the seed audience.

In some embodiments, step 304 can include expanding the conversion rules associated with the seed audience to a larger corpus of users. Specifically, in some embodiments, method 300 can run the conversion rules on a set of user events occurring during a historical time window. For example, all users who clicked a specific link during the last ninety days, or all users who visited a URL matching a pattern in the last two months. In some embodiments, no limit is placed on the number of matching users. In some embodiments, method 300 can comprise filtering the user to only return unique users (e.g., de-duplicating users satisfying multiple conversion rules).

In some embodiments, step 304 can also include calculating conversion probabilities for each of the users in the expanded user corpus. In some embodiments, method 300 can input each user into an ML model that estimates the likelihood of a user performing an action that satisfies a conversion rule for a given category. The specific form of the ML model is not limiting. In some embodiments, the ML model can comprise a random forest or neural network. In some embodiments, the ML model can be trained by selecting a time period and labeling user events as positive if a corresponding conversion occurred during the time period and negative if a corresponding conversion did not occur during the time period. During step 304, each user is input into the ML model and assigned a conversion probability (e.g., a value between zero and one).

In step 306, method 300 can comprise segmenting users based on the conversion probabilities. In an embodiment, method 300 can bucket the returned users based on stratified conversion rate intervals. For example, a quartile segmenting can be performed to group users into the highest 25%, lowest 25%, middle-highest 25%, and middle-lowest 25% segment. Other segmenting techniques can be used and indeed, more stratified segments may be computed in step 306.

In step 308, method 300 can include selecting and returning the highest-ranking segments. In some embodiments, method 300 can select the top L segments from the list of segments. In some embodiments, a given segment can be ranked based on the average conversion probability of all its users. In other embodiments, a multiplier rule can be used to select segments. For example, segments having an average conversion rate higher than five times an existing or target conversion rate can be used to select the highest-ranking segments.

In the various embodiments, existing approaches to calculating conversion probabilities of an audience can be used in lieu of the foregoing example. Many such approaches rely on user-specific audiences versus category-specific audience that span users or advertisers. As such, the seed audiences used in FIG. 3 (and created in FIG. 2) are category-specific and guided more by the user's interest in the category.

In some embodiments, the foregoing methods can be implemented in a Dynamic Product Advertising (DPA) system. In general, DPA is an automated solution that maximizes advertiser revenue by guiding advertisers in customer acquisition and re-engagement. DPA enhances customer experience by recommending products dynamically based on their online behavior. Using category-specific audience attributes computed using the methods described above enables the DPA framework to select the products these users are most likely to purchase and thereby recommend similar category products. Using embedding representations of event sequences that capture broad purchase interests is a improved way to recommend products for advertisers and retain customer engagement. Further, current DPA models sometimes utilize user contextual features including age, gender, time of date, device type and advertiser category. However, they do not capture user purchase interest at the product category level. The example embodiments bridge this gap by expanding the current set of features to include user interests represented by these product categories.

Figure 4:
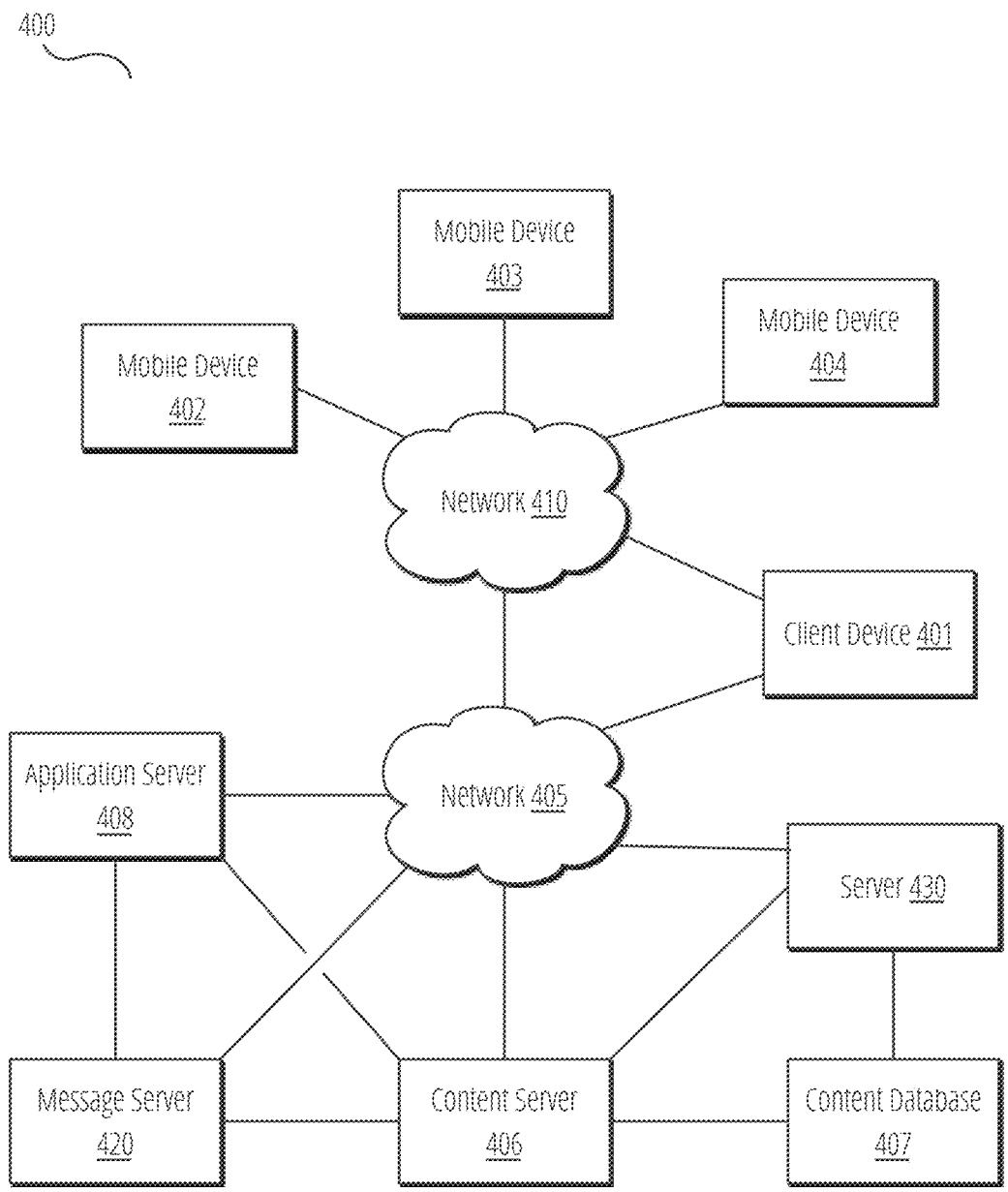
FIG. 4 is a block diagram illustrating an example of a network within which the systems and methods disclosed herein could be implemented according to some of the example embodiments.

FIG. 4 is a block diagram illustrating an example of a network within which the systems and methods disclosed herein could be implemented according to some of the example embodiments.

In an embodiment, system 400 in accordance with an embodiment of the present disclosure is shown. FIG. 4 shows components of a general environment in which the systems and methods discussed herein may be practiced. Not all the components may be required to practice the disclosure, and variations in the arrangement and type of the components may be made without departing from the spirit or scope of the disclosure. As shown, system 400 of FIG. 4 includes local area networks and wide area networks including, but not limited to, network 405, wireless network 410, mobile devices (e.g., mobile device 402, mobile device 403, mobile device 404) and client device 401. FIG. 4 additionally includes a variety of servers, such as content server 406, application server 408, message server 420, and third-party server 430.

Mobile devices may include virtually any portable computing device capable of receiving and sending a message over a network, such as network 405, wireless network 410, or the like. Mobile devices may also be described generally as client devices that are configured to be portable. Thus, mobile devices may include virtually any portable computing device capable of connecting to another computing device and receiving information, as discussed above. Mobile devices also may include at least one client application that is configured to receive content from another computing device. In some embodiments, mobile devices may also communicate with non-mobile client devices, such as client device 401, or the like. In one embodiment, such communications may include sending and/or receiving messages, searching for, viewing and/or sharing photographs, digital images, audio clips, video clips, or any of a variety of other forms of communications.

Client devices may be capable of sending or receiving signals, such as via a wired or wireless network, or may be capable of processing or storing signals, such as in memory as physical memory states, and may, therefore, operate as a server.

Wireless network 410 is configured to couple mobile device 402, mobile device 403, or mobile device 404 and their components with network 405. Wireless network 410 may include any of a variety of wireless sub-networks that may further overlay stand-alone ad-hoc networks, and the like, to provide an infrastructure-oriented connection for mobile device 402, mobile device 403, or mobile device 404.

Network 405 is configured to couple content server 406, application server 408, or the like, with other computing devices, including, client device 401, and through wireless network 410 to mobile device 402, mobile device 403, or mobile device 404. Network 405 is enabled to employ any form of computer readable media or network for communicating information from one electronic device to another.

The content server 406 may include a device that includes a configuration to provide any type or form of content via a network to another device. Devices that may operate as content server 406 include personal computers desktop computers, multiprocessor systems, microprocessor-based or programmable consumer electronics, network PCs, servers, and the like. Content server 406 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 420.

Third party server 430 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than five hundred milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 406, 408, 420 and/or 430. This may include in a non-limiting example, authentication servers, search servers, email servers, social networking services servers, SMS servers, IM servers, MMS servers, exchange servers, photo-sharing services servers, and travel services servers, via the network 405 using their various devices.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 408, message server 420, or content server 406 and the like.

Thus, the application server 408, for example, can store various types of applications and application related information including application data and user profile information (e.g., identifying and behavioral information associated with a user). It should also be understood that content server 406 can also store various types of data related to the content and services provided by content server 406 in an associated content database 407, as discussed in more detail below. Embodiments exist where the network 405 is also coupled with/connected to a Trusted Search Server (TSS) which can be utilized to render content in accordance with the embodiments discussed herein. Embodiments exist where the TSS functionality can be embodied within servers 406, 408, 420 and/or 430.

Moreover, although FIG. 4 illustrates servers 406, 408, 420 and 430 as single computing devices, respectively, the disclosure is not so limited. For example, one or more functions of servers 406, 408, 420 and/or 430 may be distributed across one or more distinct computing devices. Moreover, in one embodiment, servers 406, 408 and/or 430 may be integrated into a single computing device, without departing from the scope of the present disclosure.

Figure 5:
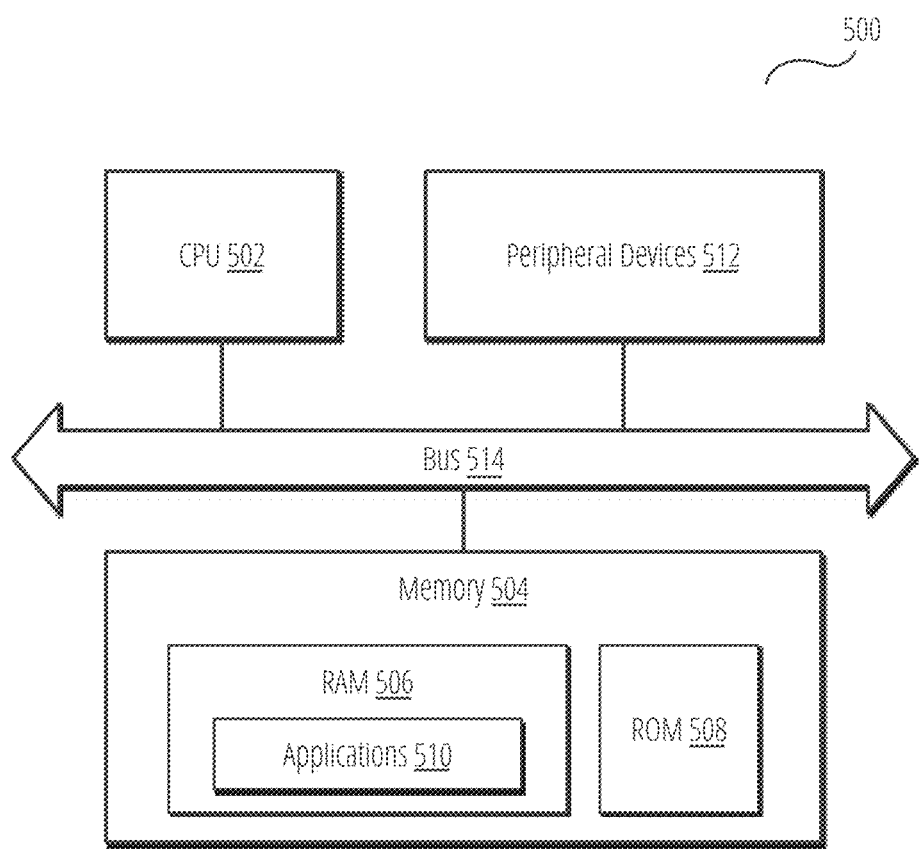
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a non-transitory memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, bus 514 may comprise multiple busses instead of a single bus.

Memory 504 illustrates an example of non-transitory computer storage media for the storage of information such as computer-readable instructions, data structures, program modules, or other data. Memory 504 can store a basic input/output system (BIOS) in read-only memory (ROM), such as ROM 508, for controlling the low-level operation of the device. The memory can also store an operating system in random-access memory (RAM) for controlling the operation of the device Applications 510 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth™, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

What is claimed is:

1. A method comprising:
    loading, by a processing device, data representing a user event sequence, the user event sequence comprising a plurality of user events and a plurality of corresponding conversions;
    generating, by the processing device, a plurality of conversion neighborhoods based on the user event sequence, a given conversion neighborhood in the plurality of conversion neighborhood comprising at least one conversion rule and a set of user events from the plurality of user events;
    annotating, by the processing device, each conversion neighborhood in the plurality of conversion neighborhoods with categorical labels; and
    generating, by the processing device, seed audiences for each conversion neighborhood, a given seed audience comprising a ranked list of user events for each conversion rule associated with the conversion neighborhood.

2. The method of claim 1, wherein generating a plurality of conversion neighborhoods comprises computing embeddings for the plurality of user events and the plurality of corresponding conversions and computing similarities among the plurality of user events and the plurality of corresponding conversions.

3. The method of claim 2, wherein computing similarities comprises using an approximate neighbor search algorithm to compute the similarities.

4. The method of claim 1, wherein annotating a respective conversion neighborhood in the plurality of conversion neighborhoods with categorical labels comprises classifying each user event in the respective conversion neighborhood based on a pre-built taxonomy of category labels.

5. The method of claim 4, wherein classifying each user event in the respective conversion neighborhood comprises inputting each user event into a random forest model.

6. The method of claim 1, further comprising generating the ranked list of user events for each conversion rule by computing similarities between embeddings representing the user events and embeddings representing the conversion rules.

7. The method of claim 1, further comprising:
    expanding, by the processing device, a seed audience in the seed audiences into a set of users;
    computing, by the processing device, conversion probabilities for the set of users;
    segmenting, by the processing device, the set of users into segments based on the conversion probabilities; and
    returning, by the processing device, a subset of the segments to a user.

8. A device comprising:
a processor; and
a storage medium for tangibly storing thereon program logic for execution by the processor, the program logic comprising:
logic, executed by the processor, for loading data representing a user event sequence, the user event sequence comprising a plurality of user events and a plurality of corresponding conversions;
logic, executed by the processor, for generating a plurality of conversion neighborhoods based on the user event sequence, a given conversion neighborhood in the plurality of conversion neighborhood comprising at least one conversion rule and a set of user events from the plurality of user events;
logic, executed by the processor, for annotating each conversion neighborhood in the plurality of conversion neighborhoods with categorical labels; and
logic, executed by the processor, for generating seed audiences for each conversion neighborhood, a given seed audience comprising a ranked list of user events for each conversion rule associated with the conversion neighborhood.

9. The device of claim 8, wherein generating a plurality of conversion neighborhoods comprises computing embeddings for the plurality of user events and the plurality of corresponding conversions and computing similarities among the plurality of user events and the plurality of corresponding conversions.

10. The device of claim 9, wherein computing similarities comprises using an approximate neighbor search algorithm to compute the similarities.

11. The device of claim 8, wherein annotating a respective conversion neighborhood in the plurality of conversion neighborhoods with categorical labels comprises classifying each user event in the respective conversion neighborhood based on a pre-built taxonomy of category labels.

12. The device of claim 11, wherein classifying each user event in the respective conversion neighborhood comprises inputting each user event into a random forest model.

13. The device of claim 11, the program logic further comprising logic, executed by the processor, for generating the ranked list of user events for each conversion rule by computing similarities between embeddings representing the user events and embeddings representing the conversion rules.

14. The device of claim 11, the program logic further comprising:
logic, executed by the processor, for expanding a seed audience in the seed audiences into a set of users;
logic, executed by the processor, for computing conversion probabilities for the set of users;
logic, executed by the processor, for segmenting the set of users into segments based on the conversion probabilities; and
logic, executed by the processor, for returning a subset of the segments to a user.

15. A non-transitory computer-readable storage medium for tangibly storing computer program instructions capable of being executed by a computer processor, the computer program instructions defining steps of:
loading data representing a user event sequence, the user event sequence comprising a plurality of user events and a plurality of corresponding conversions;
generating a plurality of conversion neighborhoods based on the user event sequence, a given conversion neighborhood in the plurality of conversion neighborhood comprising at least one conversion rule and a set of user events from the plurality of user events;
annotating each conversion neighborhood in the plurality of conversion neighborhoods with categorical labels; and
generating seed audiences for each conversion neighborhood, a given seed audience comprising a ranked list of user events for each conversion rule associated with the conversion neighborhood.

16. The non-transitory computer-readable storage medium of claim 15, wherein generating a plurality of conversion neighborhoods comprises computing embeddings for the plurality of user events and the plurality of corresponding conversions and computing similarities among the plurality of user events and the plurality of corresponding conversions.

17. The non-transitory computer-readable storage medium of claim 16, wherein computing similarities comprises using an approximate neighbor search algorithm to compute the similarities.

18. The non-transitory computer-readable storage medium of claim 15, wherein annotating a respective conversion neighborhood in the plurality of conversion neighborhoods with categorical labels comprises classifying each user event in the respective conversion neighborhood based on a pre-built taxonomy of category labels.

19. The non-transitory computer-readable storage medium of claim 18, wherein classifying each user event in the respective conversion neighborhood comprises inputting each user event into a random forest model.

20. The non-transitory computer-readable storage medium of claim 15, further comprising generating the ranked list of user events for each conversion rule by computing similarities between embeddings representing the user events and embeddings representing the conversion rules.

* * * * *

UNITED STATES PATENT AND TRADEMARK OFFICE
CERTIFICATE OF CORRECTION

| | | |
|---|---|---|
| PATENT NO. | : 11,977,563 B2 | Page 1 of 1 |
| APPLICATION NO. | : 17/716168 | |
| DATED | : May 7, 2024 | |
| INVENTOR(S) | : Chander Iyer et al. | |

It is certified that error appears in the above-identified patent and that said Letters Patent is hereby corrected as shown below:

On the Title Page

Item [72], delete "Ritest AGRAWAL, CA (US)" and insert -- Ritesh AGRAWAL, CA (US) --

Signed and Sealed this
First Day of July, 2025

Coke Morgan Stewart
*Acting Director of the United States Patent and Trademark Office*